2 Sheets--Sheet 1.

G. ELLENBERGER.
Process and Apparatus for Mashing and Cooling.

No. 169,156.　　　　　　　　　　Patented Oct. 26, 1875.

Witnesses:　　　　　　　　　　Inventor:
Wilhelm Tennleben　　　　　　Gustav Ellenberger
Richard Metzherbit G. ELLENBERGER.
Process and Apparatus for Mashing and Cooling.

No. 169,156. Patented Oct. 26, 1875.

2 Sheets--Sheet 2.

Witnesses:

Inventor:
Gustav Ellenberger

UNITED STATES PATENT OFFICE.

GUSTAV ELLENBERGER, OF BIDENKOPT, PRUSSIA.

IMPROVEMENT IN PROCESSES AND APPARATUS FOR MASHING AND COOLING.

Specification forming part of Letters Patent No. 169,156, dated October 26, 1875; application filed June 14, 1875.

*To all whom it may concern:*

Be it known that I, GUSTAV ELLENBERGER, of Bidenkopt, Prussia, have invented certain new and useful Improvements in Process and Apparatus for Reducing and Mashing and Cooling; and I do hereby declare the following to be a full, clear, and exact description of the invention, such as will enable others skilled in the art to which it pertains to make and use it, reference being had to the accompanying drawings, which form part of this specification, in which—

Figure 2:
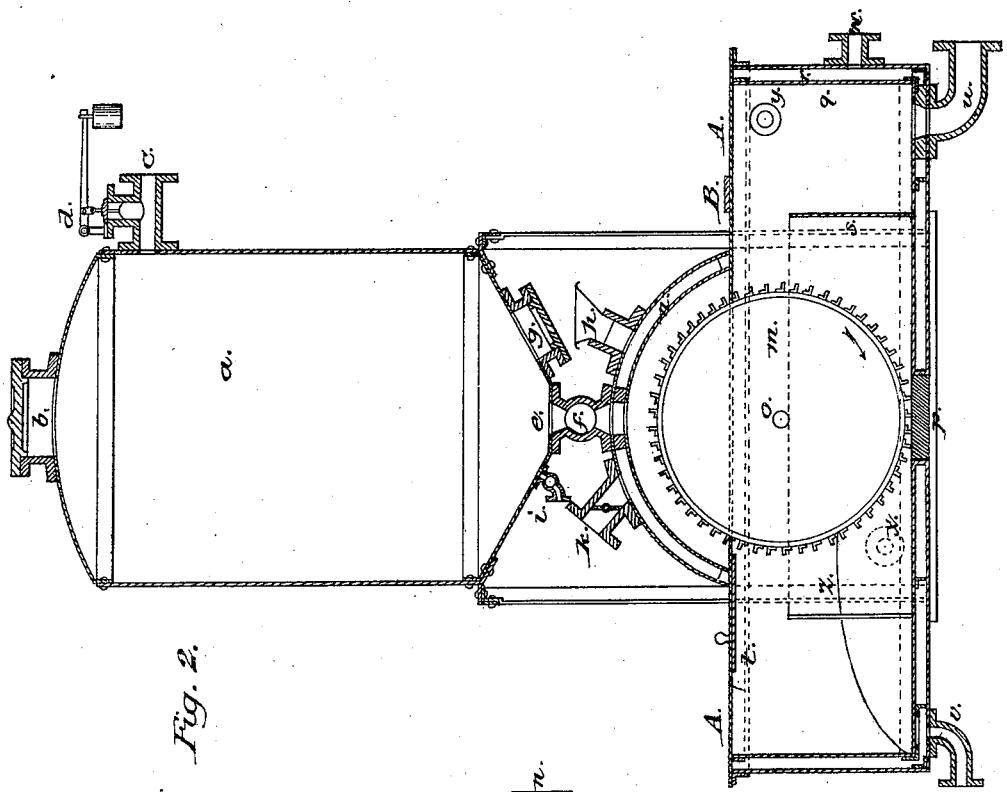
Figure 1:
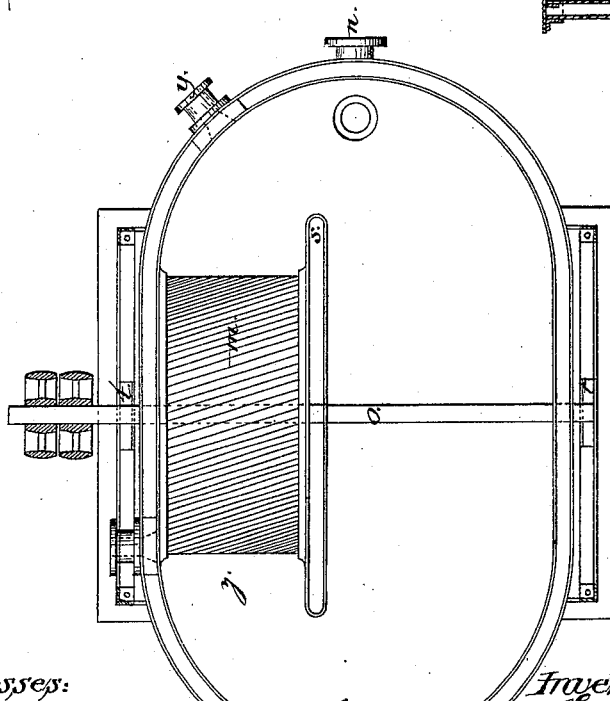
Figure 3:
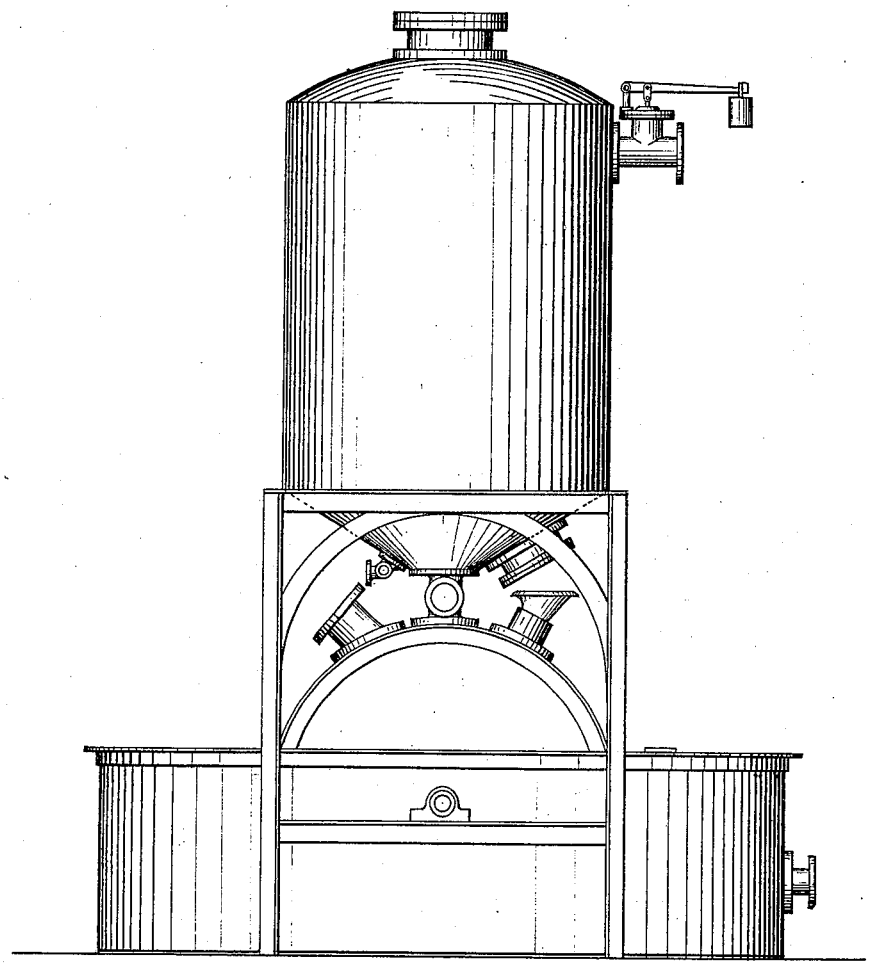

Figure 3 is an elevation of my improved apparatus. Fig. 2 is a vertical longitudinal section of the same. Fig. 1 is a plan view of the mashing apparatus with the top removed.

My invention relates to certain improvements in that class of apparatus used for reducing, mashing, cooling, and preparing for fermentation such vegetable substances as corn, grain, potatoes, &c., when treated with steam under high pressure.

The nature of my improvements consists in providing an apparatus which admits of uniting in one speedy and continuous process, as hereinafter fully described, the four steps following, to wit: first, subjecting the vegetable matters treated to the action of steam in a closed vessel under pressure; second, effecting a complete reduction of the vegetable matters to a mash of the finest quality possible; third, incorporating with the mash, while in the process of reduction, the malt necessary to prepare the same for the fermenting-vat; and, fourth, cooling the mash, thus treated, quickly and without fail.

It is important, in the art to which this invention relates, that these different steps be quickly and effectively accomplished, in order that the product shall be fitted for the fermentation-vat in its best condition adapted to secure the best results.

My improved apparatus consists, broadly speaking, of the two sufficiently-large vessels or chambers, preferably of wrought-iron. The first is closed to admit of the introduction of steam under pressure, and is provided with a safety-valve. It also has suitable ingress and egress passages with cocks, &c., to regulate the steam and its condensation. The second is a larger vessel situated, preferably, under the first, provided with an internally revolving cylinder or drum of peculiar construction, and armed with knives, mounted between a midfeather and one of the vertical walls of the vessel. This vessel is jacketed throughout, for the admission of steam, hot or cold water, as may be needed in the course of operation.

I will now proceed to describe my invention so that others skilled in the art may apply the same.

In the drawing, *a* represents a wrought-iron steam-vat adapted to withstand a pressure of about five atmospheres. In this vat are placed, by means of the filling-aperture *b*, the substance to be treated. Steam is then turned on through the inlet-passage *c, d* being a safety-valve suitably attached to the inlet-pipe. When the substances have been sufficiently treated the outlet at *e* is opened, and, by means of the regulating-cock *f*, the charge is lowered into the vessel below. The quantity of this charge is regulated by the pressure within the vat controlled by the cock *f*. Any large and coarse material, or matter of residuum, not admissible through the outlet *e*, may be removed through the aperture *g*. The small cock *i* admits of drawing off the water of condensation. *m* is a drum, consisting of a cast cylinder, upon which sloping knives are firmly attached, while *p* is a strong plate armed with knives, so situated and arranged with regard to the bottom of the vessel *q* as to be raised and lowered as occasion requires. This drum is borne upon the shaft *o*, which is supported upon bearings *t t*, fixed upon opposite sides of the vessel. This vessel *q* is the mashing-vat or mixing-tub. It is provided at *h* with a funnel and lid for the purpose of filling. *k* is a pipe and valve to regulate and carry off the steam arising during the mashing process. The hollow covering *n* is placed above the drum. It is provided with stop-cocks for retaining or turning off the water used in cooling the mash. A A are lids or covers, made to fit tightly, removable at convenience, while *l* is a slide-valve, regulating the flow of the mashing-liquor into the space above the drum, said flow arising from the centrifugal action of the same.

The bottom and sides of the mixing-tub are made hollow, or jacketed, for the admission of hot or cold water or free steam, $q$ being the inside, and $r$ being the outside, shell. The distance between these two shells is about five centimeters. The midfeather $s$ is a double iron partition arising from the bottom of the vat, having direct communication with the jacketed space. To this space steam, hot or cold water, is admitted through the pipe $w$, while $v$ is the discharge-outlet for the water or the water of condensation. $u$ is the discharge-pipe for the contents of the mashing-tub. $x$ is a conduit for the cooling water, while $y$ is a drain for the same. The sloping elevation $z$, behind the drum, serves to lift the contents of the vat during the revolution of the drum, and to assist thereby the violent agitation of the said contents.

The operation is as follows: During the steaming and preparation of the vegetable substances in the steam-vat a regulated quantity of malt, together with water, is poured into the mashing-tub through the opening B of the cover. At the same time steam is admitted to the jacket and the drum is set in motion. Owing to the shape of the vat, which is that of an ellipse, and to the action of the drum between the midfeather and the wall of the vessel, this mixture of malt and water, rising gradually in temperature, is started upon a brisk circulation, repeatedly passing beneath the drum, and, being constantly subjected to the tearing and cutting action of the knives, is thoroughly intermixed and intermingled, until it finally displays a milky color and consistency. In order that the malt thus prepared may not be scalded by the admission of the hot products of the steam-vat, it is pumped into an elevated reservoir (not shown) through the pipe $u$, which is provided for the purpose with a double vertical pipe and three-way cock. At this point—namely, when the contents of the steam-vat have been sufficiently penetrated and cooked by the steam—the outlet is opened. The charge thus prepared is lowered directly into the mashing-vat, and falls upon the drum, revolving at the rate of two hundred revolutions per minute. The operation previously described in preparing the malt is now repeated, and continued until the whole mass has been reduced to the finest possible condition. When, by the addition of water, the contents have reached the consistency of a thin pulp, and have been cooled down to about 52° Reaumur, the previously-treated malt is admitted and the drum still kept in rapid motion. During this stage of treatment the surrounding spaces, with the midfeather, are filled with water, which rapidly assimilates its temperature to that of the mash, and prevents the latter from cooling off. The steam which is thus generated may also be utilized in the steam-vat for cooking and preparing another charge.

After the addition of the sugar used in sweetening the mash, and when the whole has been thoroughly incorporated and fully intermixed, the covers are removed, and the contents of the jacketed spaces drawn off. Cold water is now poured in through pipe $w$—the drum still in motion. The process of cooling, already induced by the cold surface of the vat, is accelerated by the air-currents caused by the rotation of the drum. The slide-valve $l$ is now drawn back, thus admitting of a direct tangential discharge of a large quantity of the mash liquor against the cold inner surface of the drum-cover $n$. When the mash has become thoroughly cool, yeast is added, the mass is once more intimately mixed, and is then ready for transfer to the fermenting-tub.

When it is desired to cleanse the apparatus it is only necessary to pour water upon the drum while in revolution. The violent spattering thus produced serves to cleanse the parts immediately and thoroughly.

The advantages of my apparatus, as set forth in the foregoing description, are sufficiently obvious; but I may point out, in addition, that its use saves valuable time; that the apparatus economizes space and is easily handled; that it secures, it is believed, improved results over any known, and effects a great saving of materials, inasmuch as all are utilized and none wasted. The minute reduction brought about, united with the thorough and homogeneous mixing, alone makes it possible for all the starch particles to be sweetened and undergo a thorough separation. My improvement, however, effects this sweetening perfectly, which, with the needful fermentation, is a condition absolutely necessary to produce the best results.

What I claim as new, and desire to secure by Letters Patent of the United States, is—

1. In the art of reducing and mashing vegetable substances, and preparing the same for fermentation, the process herein described, which consists in first subjecting said substances to steam under pressure, afterward grinding the same, while hot, in a steam-jacketed vessel to a fine pulpy mass, and when said mass is partially cooled adding the requisite malt and sugar, which is followed by artificial cooling and the addition of yeast, substantially as described, and for the purpose set forth.

2. In the art of reducing and mashing vegetable substances, and preparing the same for fermentation, the process herein described, which consists in reducing steam-treated vegetable substances to a finely-divided pulpy mass, while subjected to the action of steam-heat from an inclosing-jacket, substantially as described and set forth.

3. In the art of reducing and mashing vegetable substances, and preparing the same for fermentation, the process herein described, which consists in incorporating a preparation of malt with the mash while in a finely-divided pulpy mass, and while subjected to the action of steam-heat from an inclosing-jacket, substantially as described, and for the purpose set forth.

4. The combination of a closed steam-vat for heating under pressure, with a steam-jacketed vessel for completing the mashing process, substantially as herein described.

5. A mashing-vat composed of two shells, an outer and an inner one, with steam-space between, in combination with a revolving drum and midfeather, substantially as described.

In testimony that I claim the foregoing I have hereunto set my hand this 7th day of April, 1875.

GUSTAV ELLENBERGER.

Witnesses:
WILHELM ARTH,
LUDWIG WISSMANN.